UNITED STATES PATENT OFFICE.

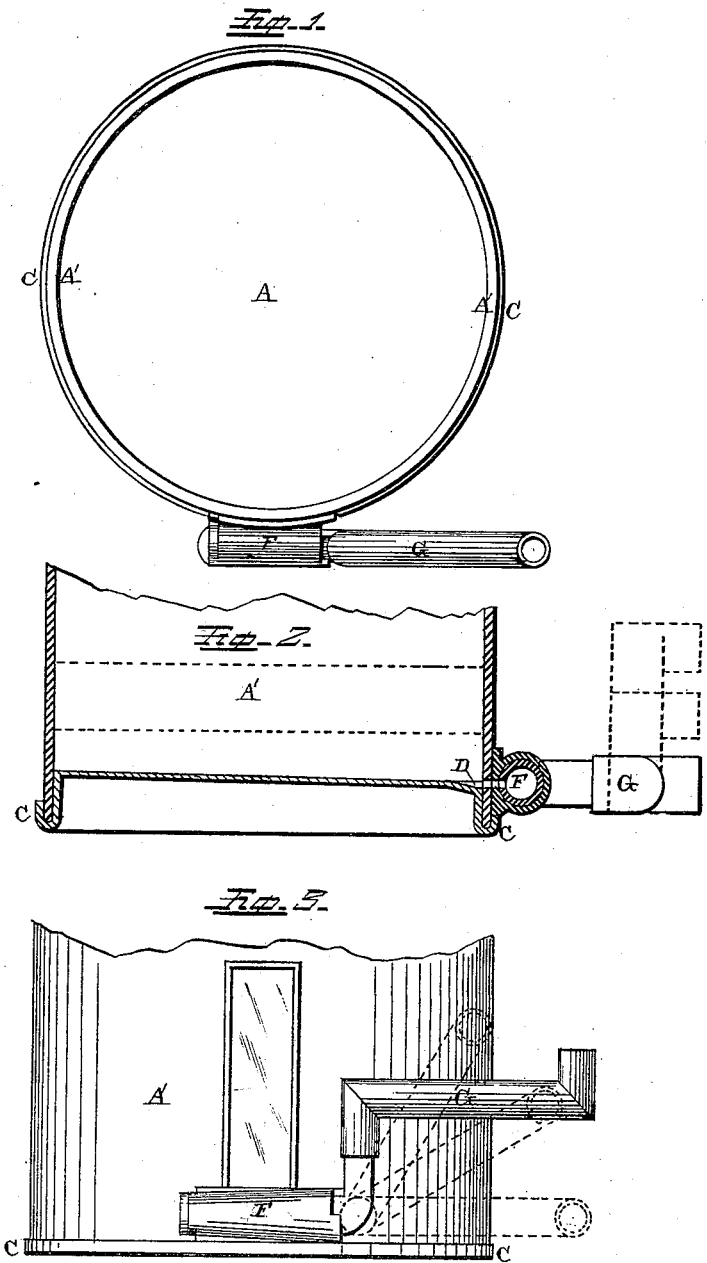

ALEXANDER LEWIS, OF MONTICELLO, IOWA, ASSIGNOR OF ONE-HALF TO H. G. LEICHHARDT, OF SAME PLACE.

DEVICE FOR SKIMMING MILK.

SPECIFICATION forming part of Letters Patent No. 241,033, dated May 3, 1881.

Application filed February 12, 1881. (No model.)

*To all whom it may concern:*

Be it known that I, ALEXANDER LEWIS, of Monticello, in the county of Jones and State of Iowa, have invented certain new and useful Improvements in Devices for Skimming Milk; and I do hereby declare the following to be a full, clear, and exact description of the invention, such as will enable others skilled in the art to which it pertains to make and use it, reference being had to the accompanying drawings, which form part of this specification.

My invention relates to an improvement in devices for skimming milk; and it consists in the combination of an inclined bottom, which is to be applied to the bottom of the can, a faucet, which is to be applied to the side of the can, and a pipe, which is to be applied to the end of the hollow plug of the faucet, and which pipe can be adjusted to the exact height or depth of the cream in the pail, whereby the milk can be drawn off so as to leave the cream behind, as will be more fully described hereinafter.

The object of my invention is to provide a device by means of which the pails or cans of milk can be skimmed by simply turning the plug of the faucet and then adjusting the pipe which is attached thereto to the thickness or depth of the cream in the vessel, and thus enable the milk and the sediment to be drawn off without disturbing the cream.

Figure 1 is a plan view of my invention. Fig. 2 is a vertical view of the same. Fig. 3 is a side elevation.

A represents the bottom of the can or pail A', in which the milk is placed for the cream to rise, and which bottom is made in a single piece, as shown. This bottom is higher upon one side than the other, so as to form an incline, down which the milk and sediment will readily flow to the faucet, and around the lower edge of this bottom is formed a turned-up flange or rim, C, inside of which the lower edge of the pail is placed, and then the pail and bottom are soldered together. This lower flange or rim is thus formed so as to prevent the necessity of having to use a stiffening-wire in order to make the can strong and stiff enough for use, and so as to prevent any part of the bottom proper of the can from coming in contact with the bottom of the pool of water in which the cans are placed for the purpose of cooling the milk so that the cream will rise. Where no special means are used for the purpose of protecting the bottoms of the cans, the bottoms in a very short time become broken, rusty, or dinged in some manner, and hence the cans last but a very short time, comparatively speaking, and add very materially to the cost of running a dairy. Where the dairy is using fifteen thousand pounds of milk per day, fifteen hundred cans or pails are necessary, and it will readily be seen that where these cans can be cheapened in cost or their durability increased a very material saving is made to the dairyman. As the lower edge of the pail fits snugly over the outside edge of this stamped-up bottom, which may be made of any suitable non-corrosive metal, it will readily be seen that the bottom is not easily worn away by being rubbed against the articles upon which it is placed, and that the whole bottom is braced in such a manner as to be very strong and rigid.

At the lower edge of the top of the bottom there is made a dinge or recess, D, so as to cause a direct downward flow to the faucet F, which is applied directly to the outside of the lower edge of the pail, as shown. This faucet consists simply of the outside casing and a hollow tapering plug, the shell being provided with shoulders, which form stops for the projection on the plug to strike against, and thus limit the movement of the plug. The shell of this faucet will be made of some soft metal, so that it can be soldered directly to the side of the can, and thus dispense with all bolts, rivets, and other such fastenings. The outer end of the plug is curved, as shown, and has the pipe G, with an elbow at each end, applied directly to it, and this pipe can have its outer end raised or depressed at the will of the operator, so as to regulate the exact amount of milk that shall be drawn from the can.

After the pail or can has been in the pool a sufficient length of time for the cream to have risen, the pail is lifted out of the pool and placed upon a bench, and then the operator sees at a glance through the glass panel in the side of the pail the exact thickness of the cream. He turns the plug of the faucet and the pipe from a vertical to a horizontal position, so as to open the plug and allow the milk to flow freely out, and at the same time he elevates the outer end of the pipe to the exact depth or thickness of the cream in the pail. The milk flows freely out; but the cream remains behind in the pail, because the outer end of the pipe has been turned upward to such a height that the cream cannot possibly pass out through it. The operator has but to regulate the height of the outer end of this pipe, and then no further time, care, or watching is required to skim the milk in the can, for after the milk has run out the cream will all be left behind. In this way the operator can skim the whole number of pails in use in a very short time. By means of the recess made in the bottom of the pail the outward flow of the milk draws in all of the sediment that may have settled upon the bottom of the pail, and thus prevent it from being left behind and becoming mixed with the cream.

My apparatus is also specially adapted for separating sediment from milk before the straining takes place.

Having thus described my invention, I claim—

The combination of a milk-can having a glass panel in its side, so as to show the thickness of the cream, and an inclined bottom, with the cock F, applied directly to the side of the can, and the pipe G, applied to the end of the plug of the cock, whereby the pipe can be adjusted so as to draw off the milk, but leave the cream behind, substantially as shown and described.

In testimony that I claim the foregoing I have hereunto set my hand this 1st day of February, 1881.

ALEXANDER LEWIS.

Witnesses:
MARTIN THOENI,
FRED S. DUNHAM.